(12) United States Patent  
Cooley

(10) Patent No.: US 8,386,588 B1  
(45) Date of Patent: Feb. 26, 2013

(54) SERIAL SUBSCRIPTIONS

(75) Inventor: Daniel J. Cooley, San Francisco, CA (US)

(73) Assignee: Adobe Systems Incorporated, San Jose, CA (US)

(*) Notice: Subject to any disclaimer, the term of this patent is extended or adjusted under 35 U.S.C. 154(b) by 447 days.

(21) Appl. No.: 12/188,705

(22) Filed: Aug. 8, 2008

Related U.S. Application Data

(60) Provisional application No. 60/955,130, filed on Aug. 10, 2007.

(51) Int. Cl.
  *G06F 15/16* (2006.01)
  *G06F 17/00* (2006.01)
  *H04N 7/173* (2011.01)
(52) U.S. Cl. .......... 709/218; 709/203; 715/210; 725/86
(58) Field of Classification Search .................. None
  See application file for complete search history.

(56) References Cited

U.S. PATENT DOCUMENTS

| 8,099,459 B2 * | 1/2012 | Plastina et al. ............... 709/204 |
| 2007/0078898 A1 * | 4/2007 | Hayashi et al. ............ 707/104.1 |
| 2008/0046948 A1 * | 2/2008 | Verosub ....................... 725/117 |

* cited by examiner

*Primary Examiner* — Wen-Tai Lin
(74) *Attorney, Agent, or Firm* — Kilpatrick Townsend & Stockton LLP

(57) ABSTRACT

Methods and apparatus provide for a serial subscriber to provide an RSS feed that is updated according to the user's consumption of serialized content. The serial subscriber creates a subscription request to receive a feed of serialized content from a content source, the feed comprising a plurality of episode references to episodes of the serialized content. The serial subscriber defines a subscription point relative to at least one episode reference within the feed of serialized content to designate where to parse the serialized content for downloading at least one episode of the serialized content. The serial subscriber creates a graphical representation of the at least one downloaded episode and monitors playback of the at least one downloaded episode to update the feed of serialized content with respect to the subscription point.

12 Claims, 7 Drawing Sheets

400

410 CREATE A SUBSCRIPTION REQUEST TO RECEIVE A FEED OF SERIALIZED CONTENT FROM A CONTENT SOURCE, THE FEED COMPRISING A PLURALITY OF EPISODE REFERENCES TO EPISODES OF THE SERIALIZED CONTENT

420 DEFINE A SUBSCRIPTION POINT RELATIVE TO AT LEAST ONE EPISODE REFERENCE WITHIN THE FEED OF SERIALIZED CONTENT TO DESIGNATE WHERE TO PARSE THE SERIALIZED CONTENT FOR DOWNLOADING AT LEAST ONE EPISODE OF THE SERIALIZED CONTENT

430 CREATE A GRAPHICAL REPRESENTATION OF THE AT LEAST ONE DOWNLOADED EPISODE

440 MONITOR PLAYBACK OF THE AT LEAST ONE DOWNLOADED EPISODE TO UPDATE THE FEED OF SERIALIZED CONTENT WITH RESPECT TO THE SUBSCRIPTION POINT

FIG. 4

SERIAL SUBSCRIPTIONS

PRIORITY TO PROVISIONAL APPLICATION

This U.S. Utility Patent Application claims the benefit of the filing date of earlier filed U.S. Provisional Application for patent having U.S. Ser. No. 60/955,130, filed on Aug. 10, 2007, entitled "SERIAL SUBSCRIPTIONS". The entire teaching, disclosure and contents of this provisional patent are hereby incorporated by reference herein in their entirety.

BACKGROUND

Computer networks allow the distribution of information between many numbers of computer systems. Various computer program applications (i.e. software) and data communications protocols support a wide variety of different types of data communications and information exchange. As an example, a computer user using a web browser software application that operates on a local computer system can communicate using a hypertext transport protocol with remote computer systems known as web servers over a computer network such as the Internet to obtain web page content for viewing by the user on a local computer system. Other types of communication mechanisms include electronic mail, instant messaging, voice over network communication, and so forth.

One type of communication mechanism that is becoming popular is "syndicated streaming" or "feed" communication that allows a computer program known as a streaming feed reader or aggregator to operate on a networked computer system to periodically check a list of syndicated stream data "feeds" on behalf of a user and display any updated articles or other content that the application finds within those feeds. Feed readers or aggregators are able to subscribe to streaming data feeds that are essentially specially formatted files provided from remote computer systems such as web sites or other servers that are of interest to a user operating the aggregator. A set of standardized data formats collectively known as Really Simple Syndication (RSS) provide a simple extensible markup language (XML) based system that allows content or feed providers to identify available "channels" of content items in one of the RSS formats and allows users to subscribe to their favorite websites using the aggregator application. The aggregator is able to read the RSS formatted feed(s) selected by the user to list available content items within each channel (i.e. within each feed) for viewing by the user. Using RSS, webmasters or other content providers can thus put their content items into a standardized RSS data format (an XML format conforming to standard tags and conventions to list and describe content items), which can be accessed, viewed and organized through RSS-aware aggregator software or automatically conveyed as new content on another website.

A typical RSS streaming data feed comprises an XML file that defines a channel, and which RSS standardized tags define a title, link, description, and other optional fields/tags, followed by a series of content items, each of which have a set of tags used to indicate a title, link, and description of that content item. There can be many sets of content items (i.e. title, link and description tags with other optional fields/tags) in a single feed file and the RSS formatted files conform to one of several different standard RSS XML data formats (examples of which include RSS 1.0, RSS 2.0, Atom 0.3, and Atom 1.0). It is now common to find RSS (examples of which include RSS 1.0, RSS 2.0, Atom 0.3, and Atom 1.0) web feeds available for access on major or popular websites as well as on many smaller or less popular ones. RSS-aware aggregator or feed reader programs are available for download to various operating systems such as Windows and MacOS. Client-side RSS-based readers and aggregators are typically constructed as standalone programs or extensions to existing programs such as web browsers and are able to interpret the RSS data format to present the channels (i.e. feeds) and associated content items for selection by a user for viewing.

Any type of content that can be broken down into discrete content items can be syndicated via RSS. As an example, content such as recent changes to a web page such as a weblog, a revision history of a book, or new episodes of a TV show, new songs available from an artist, or the like can each be identified and formatted into an RSS feed. Once information about each content item is in RSS format, an RSS-aware program such as an aggregator can periodically check one or more feeds for changes and react to the changes in an appropriate way such as by displaying the newly available content selections for access by the user. Popular websites that are continuously developing new content for viewing by a user utilize RSS streaming data feeds to publish the content for access by aggregator applications operated by users who are interested in keeping up with current content available from those sites. A user may subscribe to many different feeds, each also known as a channel.

A typical aggregator program provides a graphical user interface that includes multiple display regions. A channel display region identifies various RSS feeds or "channels" that the user has configured the aggregator to obtain. When a user selects a particular channel in the channel display region, a content item selection region of the graphical user interface displays content items (e.g. as thumbnail icons, lists, or other list-oriented views) available from the channel (i.e., items described in the RSS data format for that feed). As an example, if the user selects a news channel from the channel selection region, the aggregator application will obtain the current RSS feed for that news channel and will display all available content selections such as all new stories within the content selection region. Each content item in the feed can be shown, for example, as a thumbnail or icon or textual line item representing content available for presentation to the user if the user were to choose that content item icon. The content item selections for a particular channel are independently identified within the RSS data format. Once the content items for a particular channel are shown for selection by the user, the user may then select a particular content item from the content selection region. In response, the aggregator will then obtain that item of content (e.g., by referencing a URL encoded within the RSS data format for that content item) and will play or otherwise reproduce or present that content in a content presentation display region (e.g., a play window) on the graphical user interface of the aggregator. Often the content items are videos or multimedia presentations, though they may be simply web pages or static text or audio. If the user selects a different channel from the channel selection region, the aggregator will read the current feed for that channel and change the content items within the content selection region to show all content items available for the new channel selection that are present in the feed. Again, the user may select a particular content item associated with that channel for viewing and the aggregator will access that particular content item and play that content in the content presentation region

SUMMARY

Conventional computer systems that allow users to select and interact with content items in a media feed suffer from a variety of deficiencies. Specifically, conventional media feeds provide users with access to media portions according to a predetermined schedule rather than customizing which media portions are made available to a particular user based on that user's consumption of various media portions provided by the media feed.

For example, when a content source publishes a new media portion for a media feed, the conventional media feed places the new media portion at the front of the media feed's "queue" and the media feed discards the oldest (or last) media portion in the media feed—regardless if a particular user has yet to complete a viewing of the last media portion. Thus, when a conventional aggregator checks the conventional media feed, the conventional aggregator will always initially encounter the newest media portion and provide the user with access to the new media portion even though the user will most likely prefer to complete a viewing of the discarded media portion. Currently, there is no mechanism to allow conventional aggregators to customize media feeds based on which media portion was last accessed by a particular user, or to provide access to media portions based on the particular user's consumption of the media portions in the media feed.

Such a conventional approach is problematic when the user is consuming (e.g. play, view, listen, etc.) serialized content from a media feed—where the serialized content's subject matter is developed across sequentially ordered content item. For example, the user is forced to consume each media portion at a rate that keeps pace with how often the media feed is updated with new media portions. If the user subscribes to the media feed after the serialized content has already begun being produced and distributed, the user may not be able to access "older" media portions that have already been discarded in order to "catch up" and become familiar with the serialized content. Thus, the user is limited to accessing only those media portions currently being provided by the media feed—regardless of when the user subscribed to the media feed and which media portion the user prefers to consume first.

Another conventional approach to delivering serialized content is known as a "multi-pass," an implementation found within iTunes from Apple, Inc. iTunes and Apple are registered trademarks of Apple Computer, Inc. of Cupertino, Calif., USA. In iTunes, a user can purchase a multi-pass for a television series and can get instant access to all available episodes, which download to the user's computer upon purchase of the multi-pass. Additionally, the multi-pass allows access to a predetermined number of future episodes that download to the user's computer once they are posted (i.e. released) and when the user logs on to the iTunes website.

The conventional approach of the multi-pass has deficiencies as well. First, the multi-pass downloads all available episodes to the user's computer instead of allowing the user to simply select and download only those episodes that are truly desired for viewing by the user. Second, the new episodes are downloaded as they are made available regardless of whether or not the user has completely watched "earlier" or "older" episodes. Thus, additional storage requirements and download wait times are encountered with multi-pass regardless of the rate and order by which user is consuming episodes.

Mechanisms and techniques discussed herein significantly overcome the deficiencies of conventional applications such as those discussed above. As will be discussed further, embodiments herein are directed to a serial subscriber within a client (or server) that operates with media feeds (such as RSS feeds) that encode serialized content.

The system disclosed herein provides the ability to monitor a user's consumption of content from the media feed to so that each time the user accesses the media feed, the client (or server) customizes the media feed to provide access to portions of content relative to a position (i.e. a point, a location, etc.) in the media feed last accessed or chosen by the user. The embodiments of the serial subscriber as described herein contrast with conventional systems by providing a user with a media feed updated according to the user's consumption of serialized content.

For example, in one embodiment, the user can subscribe to an RSS feed to receive access to episodes of serialized content. A content producer creates the RSS feed to include every currently available episode of the serialized content. The user's RSS client detects that the RSS feed is related to the serialized content and presents a user interface providing the user with options to choose a subscription point (e.g, select an episode) within the RSS feed from which to begin a subscription to the RSS feed.

The RSS client downloads (e.g. caches) every episode (or a given number of episodes) of that occurs after the subscription point selected by the user. As the user consumes a downloaded episode (or a portion of a downloaded episode) of the serialized content, the RSS client (or server) monitors how much of each downloaded episode the user has played and removes access to episodes that the user has completely played-back from the media feed and can delete those "completely played-back" episodes from the client's memory. The RSS client also detects when to download more episodes of serialized content as the user consumes previously downloaded episodes. For instance, if the user selected a subscription point at episode 6 from an RSS feed of consisting of a total of 12 episodes and initially downloaded three episodes (such as episodes numbered 6, 7, 8) the RSS client downloads the next three episodes (episodes 9, 10, 11) when it detects that the user has completely viewed episodes 6 and 7 and has begun playing back downloaded episode 8.

Specifically, in various embodiments, the serial subscriber creates a subscription request to receive a feed (such as an RSS feed) of serialized content from a content source. The feed includes a plurality of episode references to episodes of the serialized content, where each episode reference is associated with a particular episode of serialized content.

The serial subscriber defines a subscription point relative to an episode reference within the feed. The subscription point designates where to begin parsing the feed so that a portion of the feed (one or more episodes) is downloaded (or streamed). The serial subscriber creates a graphical representation for each downloaded episode. When the user wishes to play back an episode, the serial subscriber allows the user access to an episode upon detecting a selection of the episode's corresponding graphical representation. As the user views (i.e. consumes) the episode, the serial subscriber monitors playback of downloaded episode to determine when to update the feed of serialized content with respect to the subscription point. In this manner, as the user consumes (e.g. watches, plays, listens to, etc.) each downloaded episode (or a portion of a particular downloaded episode), the serial subscriber updates the user's subscription point to a position in the feed that is proximate to (e.g. just after) episodes the user recently downloaded (or consumed).

In another embodiment, the content producer (e.g. the source of the serialized content, such as an RSS feed web server) creates the RSS feed but does not include every episode of the serialized content. Instead, when a user subscribes to the RSS feed, the RSS server uniquely identifies the user and generates a serial feed for that user from a uniform resource locator (U.R.L.). The RSS server advances the serial feed for that user against the RSS feed at a fixed schedule (e.g.

once per week) by updating the serial feed with a certain number of episodes until the serial feed has caught up with the RSS feed.

Thus, the serial subscriber receives a subscription request to create a subscription feed of serialized content from a content source. The subscription feed is uniquely associated with the subscription request and the subscription feed comprises a subset of a main feed of a plurality of episode references to episodes of the serialized content provided by the content source. The serial subscriber defines a subscription point to designate where to parse the subscription feed from the main feed to download one or more episodes of the serialized content. The serial subscriber creates a graphical representation of each of the downloaded episode(s) such that each episode's graphical representation is presented to the user.

At the content source (e.g. server system), the serial subscriber monitors playback of the each downloaded episode to determine when to advance the subscription feed against the main feed according to the subscription point. Hence, the serial subscriber provides the advantage of receiving an RSS feed that is updated according to the user's consumption of the serialized content provided by the RSS feed. Additionally, the serial subscriber allows the user to choose where in the feed to begin a subscription instead of having to subscribe to the entire feed, at the beginning of the feed, or to only the "latest" items currently available. Also, the serial subscriber track the user's consumption of downloaded content and retains information regarding the user's consumption.

In yet another embodiment, the serial subscriber presents a feed of serialized content to a user during a first viewing session via a graphical user interface. The serial subscriber detects an event that indicates termination of presenting the feed of serialized content to the user in the first viewing session. For example, the serial subscriber detects that the user has selected to close the graphical user interface that presents the feed to the user. In response to the event, the serial subscriber maintains a position relative to the feed of serialized content as last presented to the user in the first viewing session. When the serial subscriber detects a request for presentation of the feed of serialized content to the user during a second viewing session, the serial subscriber presents the feed of serialized content to the user during the second viewing session at the position relative to the feed of serialized content as last presented to the user in the first viewing session.

For example, during the first session, the position in the feed corresponds to a $5^{th}$ video episodes in a feed of 20 streamable video episodes. The position indicates that the user last accessed the $5^{th}$ episode from the feed source to the user's client system. However, after the user's first viewing session, the source of the feed updates the feed by adding video episodes 21-25 to the feed.

When the user accesses the feed via the graphical user interface to initiate a second viewing session, the serial subscriber detects the update of the feed of serialized content that occurred between the first viewing session and the second viewing session. However, serial subscriber maintains the position as last presented to the user in the first viewing session in the updated feed of serialized content. In other words, the serial subscriber maintains the position at the $5^{th}$ video episode in the updated feed providing the 25 video episodes.

In another example, if the user had downloaded the $5^{th}$ video episode from the feed during the first viewing session and completed a total viewing of the $5^{th}$ video episode after terminating the first viewing session but before the second viewing session, the serial subscriber detects the playback status of the $5^{th}$ video episode and, in the second viewing session, the serial subscriber advances the position in the updated feed to correspond to the $6^{th}$ video episode.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein. Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such embodiments can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif., U.S.A., herein after referred to as "Adobe" and "Adobe Systems."

BRIEF DESCRIPTION OF THE DRAWINGS

The foregoing and other objects, features and advantages of the invention will be apparent from the following more particular description of embodiments of the methods and apparatus for serial subscriber to allow for provide an RSS feed that is updated according to the user's consumption of serialized content, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

FIG. 4 is a flowchart of processing steps performed by the serial subscriber according to embodiments herein.

DETAILED DESCRIPTION

Figure 1:
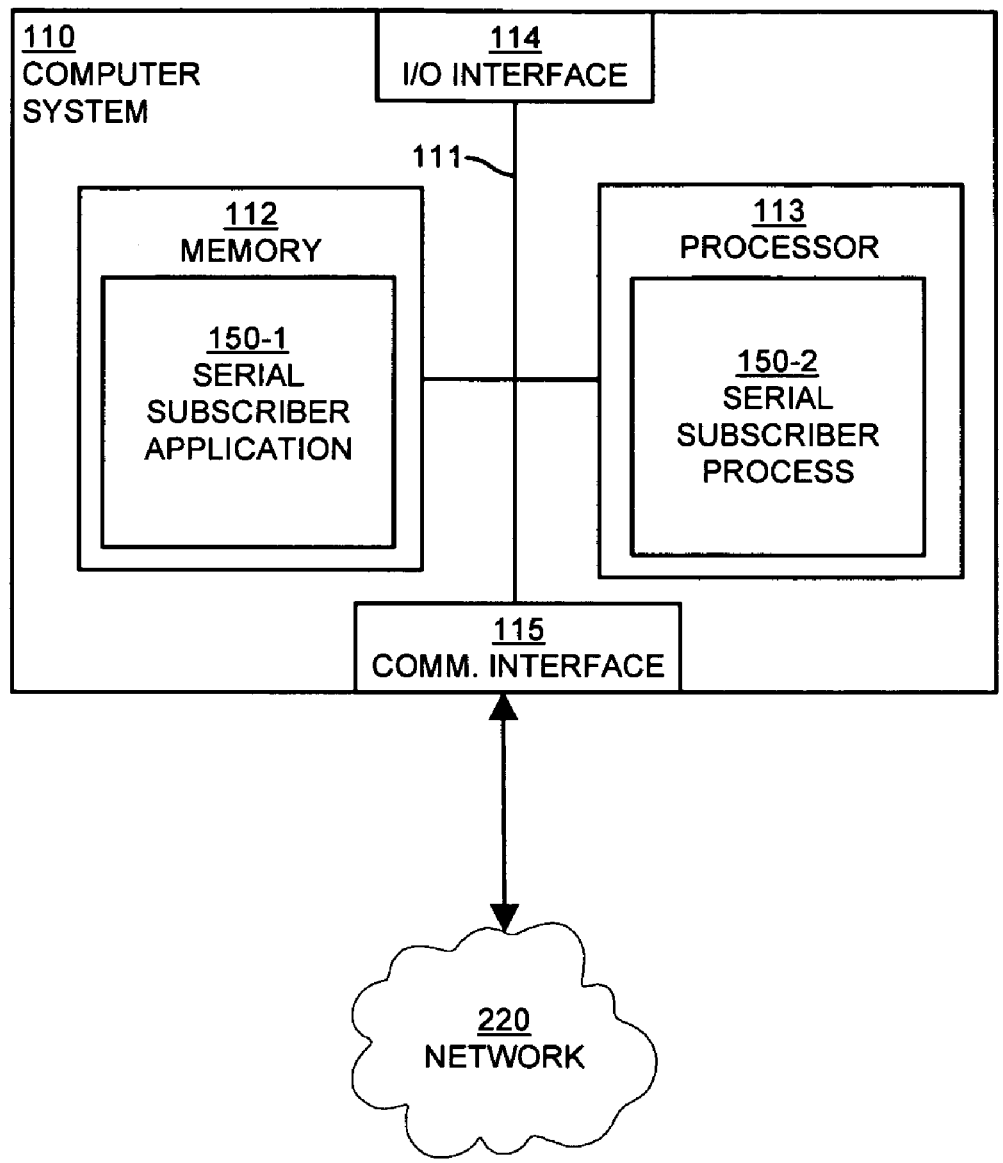
FIG. 1 is a block diagram of a computer system configured with a serial subscriber according to embodiments herein.

According to embodiments herein, a serial subscriber is configured to provide an RSS feed that is updated according to the user's consumption of serialized content. Depending upon the embodiment, the serial subscriber can either be implemented within a client or a server or as a combination. In one embodiment, a user can specify a particular point in the feed of serialized content and the client can create a subscription request indicating a particular episode reference as a subscription point in the feed of serialized content. When the client receives the feed, the client can display a graphical representation of the episode that corresponds with the user-specified subscription point, as opposed to requiring the user to navigate or scroll forward to locate that particular episode.

In another embodiment, the user-specified subscription point can be sent to a server that produces a feed customized to contain the episodes of interest to that user—beginning with the episode occurring in the feed at the subscription point. In another embodiment, as a user consumes or watches episodes of serialized content, the client remembers which episode that user last consumed (or downloaded), such as by storing that episode's reference in a cookie local to the client. When the user returns to download additional episodes from the feed of serialized content, the server can detect information stored in the cookie to customize the feed so that the feed presents episodes that start from just after the episode that the user most recently viewed (or downloaded). It is understood that the words "downloaded" and "streamed" can be used interchangeably, the words "download" and "stream" can be used interchangeably, and the words "downloading" and "streaming" can be used interchangeably.

Thus, as a user uses the client to watch episodes and then quits the client or changes to a different feed, the client can store the last view location as a subscription point. The next time the user visits that feed, the client can access the previously stored subscription point for that stream and can present the feed at that point, as if the user never left. The user thus does not have to remember where they were in that feed. In another embodiment, the server is responsible for remembering a location of a particular client or user that last viewed a stream so that when that client user returns to the stream, the server can serve the stream beginning at that location or episode.

Thus, an example of the system disclosed herein allows presentation of a feed of serialized content to a user during a first viewing session. The user may select a specific episode, or may begin watching a feed form the first episode. The serial subscriber can detect an event that indicates termination of presenting the feed of serialized content to the user in the first viewing session. For example, the user might have selected a new feed, or closed the client, or stopped playback of a given episode. In response to the event, the serial subscriber maintains a position relative to the feed of serialized content as last presented to the user in the first viewing session. The client or server might store a cookie or other data indicating where the user left off viewing that feed in that first viewing session.

Thereafter, the serial subscriber detects a request for presentation of the feed of serialized content to that same user (or to the same client that might be controlled by a different user) during a second viewing session. The second viewing session may be hours or days later.

In response to the request, the serial subscriber presents the feed of serialized content to the user during the second viewing session at the position relative to the feed of serialized content as last presented to the user in the first viewing session. In this manner, as a user consumes or views or listens to serialized content (all referred to as viewing in the above example), the serial subscriber is able to track where that user leaves off, and can use this data to present that same feed at a later time at a location relative to that last viewing location. Thus, a user does not have to remember what portion of serialized content they last viewed.

Turning now to FIG. 1, a block diagram illustrates an example of architecture for a computer system 110 that executes, runs, interprets, operates or otherwise performs a serial subscriber application 150-1 and/or serial subscriber process 150-2 (e.g. an executing version of the application 150-1 controlled by user) according to embodiments herein. The computer system 110 may be any type of computerized device such as a personal computer, server, workstation, portable computing device, console, laptop, network terminal or the like.

As shown in the present example, the computer system 110 includes an interconnection mechanism 111 such as a data bus, motherboard or other circuitry that couples a memory system 112, a processor 113, an input/output interface 114, and a display 130. An input device can (e.g., one or more user/developer controlled devices such as a keyboard, mouse, touch pad, etc.) couple to the computer system 110 and processor 113 through an input/output (I/O) interface 114. The memory system 112 can be any type of computer readable medium and, in this example, is encoded with a self-enclosed timeline trimmer application 150-1 that supports generation, display, and implementation of functional operations as will be further explained herein.

During operation of the computer system 110, the processor 113 accesses the memory system 112 via the interconnect 111 in order to launch, run, execute, interpret or otherwise perform the logic instructions of the serial subscriber application 150-1. Execution of the serial subscriber application 150-1 in this manner produces the serial subscriber process 150-2. In other words, the serial subscriber process 150-2 represents one or more portions or runtime instances of the serial subscriber application 150-1 (or the entire application 150-1) performing or executing within or upon the processor 113 in the computerized device 110 at runtime.

Figure 2:
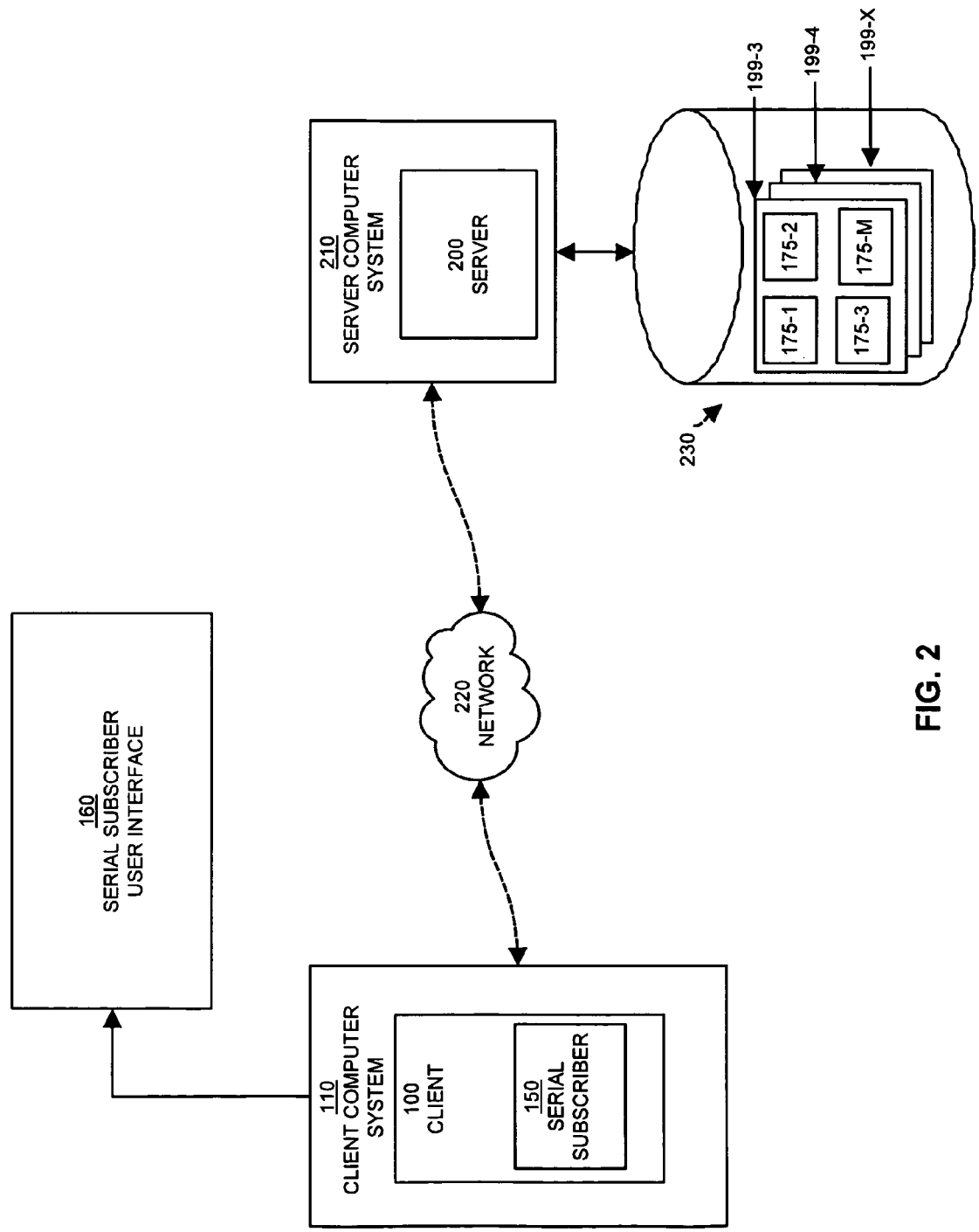
FIG. 2 is a block diagram of a computer system configured with a serial subscriber according to embodiments herein.

FIG. 2 is a block diagram of a computer system configured with a serial subscriber according to embodiments herein. A client computer system 110 includes a client 100 and a serial subscriber 150. A serial subscriber user interface 160 provides a representation of the processes and operations of the serial subscriber 150 to the user. The client computer system 110 can communicate with a server computer system 210 via a network 220. The server computer system 210 includes a server 200 and is associated with a content source 230. The content source 230 provides multiple feeds (e.g. RSS feeds) 199-3 to 199-X that a user can subscribe to from the client computer system 110. Each feed 199-3 to 199-X includes episode references to episodes of serialized content stored at the content source 230. For instance, feed 199-3 includes multiples episodes references 175-1 to 175-M. Although only four episodes references are illustrated in FIG. 2, use of the reference numeral 175-M is intended to imply that feed 199-3 can include any number of episode references. It is understood that in other embodiments, the serial subscriber 150 can be included with the server computer system 210.

Feed 199-3 can, for example, provide references to television episodes of a particular T.V. series, with episode references 175-1 to 175-M referring to episodes that occur midway into the feed 199-3 (or midway into the T.V. series). A user can utilize the serial subscriber 150 to subscribe at a desired point in the feed 199-3. The user can send, via graphical user interface 160, a subscription request from the client 100 to the server 200 to receive feed 199-3. The user receives a graphical presentation of the feed 199-3 in the user interface 160 which allows the user to define a subscription point in the 199-3. If the user is not interested in the earlier episodes of the T.V. series of the feed 199-3, the user can select, again via graphical user interface 160, a subscription point in the feed 199-3 that occurs after the earlier episodes of the T.V. series. Thus, the subscription point can be placed midway in the feed 199-3, thereby defining the subscription point relative to episode references 175-1 to 175-M. The user can then download episodes 175-1 to 175-M to the client 100 and can watch (i.e. consume) the episodes at a preferred pace.

The serial subscriber 150 monitors the user's consumption or playback of the downloaded episodes 175-1 to 175-M and retains (either locally or at the server) information as to the playback status of each episode (such as how much of each episode has been watched). Update conditions can be defined by the user (or be based on default settings) to update the feed 199-3 according to the user's viewing of the episodes 175-1 to 175-M. For instance, an update condition can occur when the user has viewed all but one of downloaded episodes 175-1 to 175-M. Once the serial subscriber 150 detects this condition, the serial subscriber 150 can update the feed 199-3 via a request to the server 200 to provide the "next" episode references from episodes 175-1 to 175-M and the serial subscriber 150 reconnects to the updated feed 199-3 to allow the user's client 100 to download the "next" episodes. It is understood that the serial subscriber 150 can include a web media aggregator. Thus the system enables a user to specify a specific episode and the client can request the feed to contain this episode. Or if all episodes are in the feed, the serial subscriber can cause the client 100 to present the feed within the graphical user interface at the user specified location, or at a location or episode in the feed last viewed by the user. The serial subscriber can maintain this information (e.g. in a local cookie) on behalf of the user so as the user re-visits the feed in another session with the client, the feed will be presented at the last episode that user was previously viewing or has last viewed.

Figure 3:
FIG. 3 is a block diagram of an enlarged view of the serial subscriber user interface according to embodiments herein.

FIG. 3 is an enlarged view of the serial subscriber user interface 160 in FIG. 2. When the serial subscriber 150 is operating, a user controls the serial subscriber 150 to subscribe to one of more streaming data feeds 199-1 through 199-X provided by one or more servers 200. The serial subscriber user interface 160 shows the feeds 199-1 through 199-X that the user in this example has subscribed to. The streaming data feeds 199 (i.e., each channel) may be RSS feeds providing serialized rich media content, for example, and each represents a feed and contains an encoding of a set of serialized content items (e.g. episodes) 175 available from that feed. During operation, the serial subscriber 150 can present the user interface 160 in a display of the computerized device 110 and displays each serialized content item (e.g. episode) 175-1 through 175-M for the selected feed (i.e. RSS feed) 199-3 that adheres to the user's subscription requirements and rate of content consumption.

In this example, the serial subscriber 150 can include an RSS-aware streaming data feed aggregator. The user has thus subscribed to several feeds 199-1 through 199-X (only a few have reference numerals shown by way of example) as shown in the channel selection display region 171 of the user interface 160. The user has defined a subscription point in feed 199-3 entitled "Media Corp" and in response, the serial subscriber 150 has obtained the RSS data format for that feed 199-3 which identifies many serialized content items 175-1 through 175-M in the content item selection region 172. The serial subscriber 150 causes the serialized content items 175-1 through 175-M to be identified and received relative to where the user defined subscription point in the feed 199-3. In other words, content items 175-1 through 175-M can be episode references to episodes of a T.V. serial, where 175-1 through 175-M occur midway in the feed 199-3 (i.e. midway in the T.V. serial). Hence, in this example the user choose to subscribe midway into the feed 199-3 and was not interested in serialized content items (e.g. episodes) prior to or after content items 175-1 through 175-M. However, as the user watches the episodes 175-1 through 175-M, the serial subscriber 150 monitors the user's consumption of the episodes and can detect when to update the feed 199-3 with content items that occur after 175-1 through 175-M. Hence, the serial subscriber 150 allows the user to choose where in a serial sequence of an RSS feed to begin receiving serialized content and the serial subscriber provides an RSS feed that can update itself according to the user's consumption that serialized content. The serial subscriber can also remember which content item 175 the user last watches and the next time the user views that feed, the last view content item can serve as a starting point (or the next episode after that last viewed item).

Also in this example of FIG. 3, the user has selected content item 175-2 in response, the rendering application 150 presents (i.e., plays) the content 176 (a video in this example) associated with that content item 175-2 in the content presentation display region 173 of the graphical user interface 160.

FIG. 4 is a flowchart of processing steps performed by the serial subscriber according to an example embodiment herein. The steps in flowchart 400 relate to the features as illustrated in the block diagram of FIG. 2. It is understood that the processing steps of FIG. 4 are meant to provide a high-level description of the steps performed by the serial subscriber 150. Further details of the processing steps presented in FIG. 4 are illuminated in FIGS. 5-7.

In step 410, the serial subscriber 150 creates a subscription request to receive a feed of serialized content from a content source, the feed comprising a plurality of episode references to episodes of the serialized content. The user can use a web browser to send subscription request over a network 220 to a server computer system 210 (associated with the content source) to request a subscription to one or more feeds 199-X. Upon receipt of such subscription request, the server computer system can send particular feed 199-3 to which subscription is sought back to the web browser.

In step 420, the serial subscriber 150 defines a subscription point relative to at least one episode reference within the feed 199-3 of serialized content to designate where to parse the serialized content for downloading at least one episode of the serialized content. For example, the user can select where in the feed the subscription begins, thereby "trimming" the feed 199-3 by avoiding some of the serialized content that occurs prior to the subscription point. Once defined (i.e. selected), the subscription point can be embedded in the data format of the feed (e.g. RSS feed) in order to indicate where to begin parsing the feed to download one or more episodes of the serialized content. The user can also define how many episodes starting from the subscription point to download as well. Depending upon the embodiment, the client can maintain this information and can get the feed from the server (e.g. with more episodes than are of interest to the user) and the client process the feed locally to show the user only the episodes of interest to the user (e.g. which episode the user specified, or where they last left off). Alternatively, the serial subscriber 150 can transfer this information to the server and the server can provide a custom version of the feed that is specific to that client (e.g. that only contains the episodes of interest that user, that are either specifically requested by that user, or that represent the next set of unwatched episodes as indicated by the remember position maintained by the client and sent to the server from the last time the user viewed that feed).

In step 430, the serial subscriber 150 creates a graphical representation of the at least one downloaded episode. As parsing and downloading in accordance with the subscription point within the feed 199-3 occurs, the serial subscriber 150 creates a graphical representation for each downloaded episode 175-1 through 175-M. The graphical representation can be an icon or a still video frame from the episode to provide the user with a visual cue in the user interface 160 of where to "click" in order to begin (or resume) watching a downloaded episode.

In step 440, the serial subscriber 150 monitors playback of the at least one downloaded episode to update the feed 199-3 of serialized content with respect to the subscription point. As the user watches (i.e. "plays") downloaded episodes 175-1 through 175-M, the serial subscriber 150 can track and remember where in each episode the user is and, upon detection of an update condition, can reconnect to the feed 199-3 to download a certain number of the "next" episodes that occur after 175-1 through 175-M.

Figure 5:
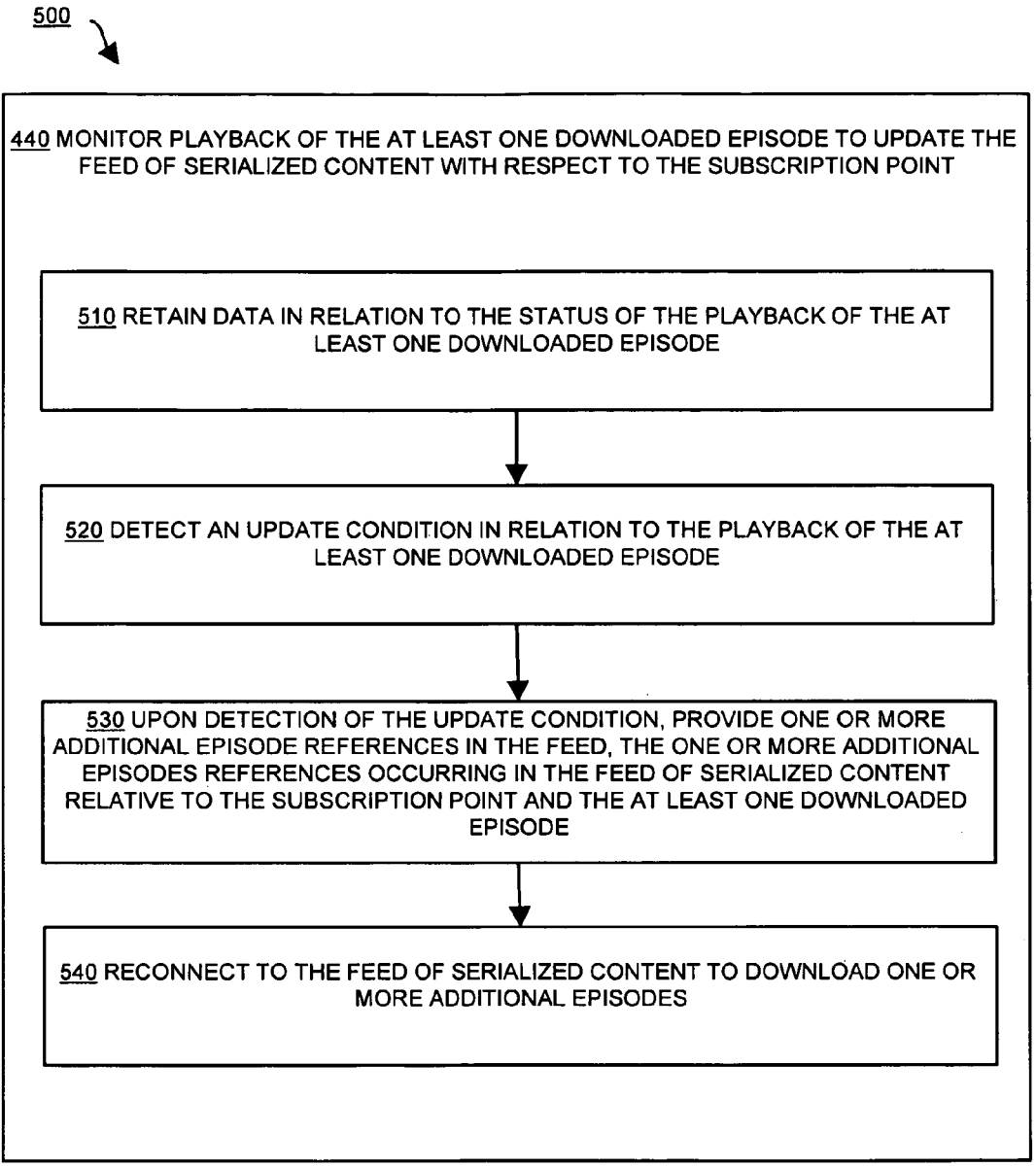
FIG. 5 is a flowchart of processing steps performed by the serial subscriber to monitor playback of a downloaded episode to update a feed of serialized content with respect to a subscription point according to embodiments herein.

FIG. 5 is a flowchart of processing steps performed by the serial subscriber to monitor playback of a downloaded episode to update a feed of serialized content with respect to a subscription point according to embodiments herein. The steps in flowchart 500 relate to step 440 of FIG. 4 and to the features as illustrated in the block diagrams of FIG. 1 and FIG. 2.

In step 510, the serial subscriber 150 retains data in relation to the status of the playback of the at least one downloaded episode. The serial subscriber can flag each downloaded episode as "read", thus assisting the user to efficiently consume new content by identifying new and unread content separate from old and already read or viewed content.

In step 520, the serial subscriber 150 detects an update condition in relation to the playback of the at least one downloaded episode. Such an update condition can be an indication that an episode has been completely played back, that the episode is currently playing (i.e. being watched by the user), or that the there remains only one downloaded episode yet to be watched by the user. It is understood that there can many other update conditions and that the examples provided are not meant to be limiting.

In step 530, the serial subscriber 150, upon detection of the update condition, provides one or more additional episode references in the feed, the one or more additional episodes references occurring in the feed of serialized content relative to the subscription point and the at least one downloaded episode. In step 540, the serial subscriber 150 reconnects to the feed of serialized content to download one or more additional episodes. The subscriber 150 can also remember this update condition for future reference.

Figure 6:
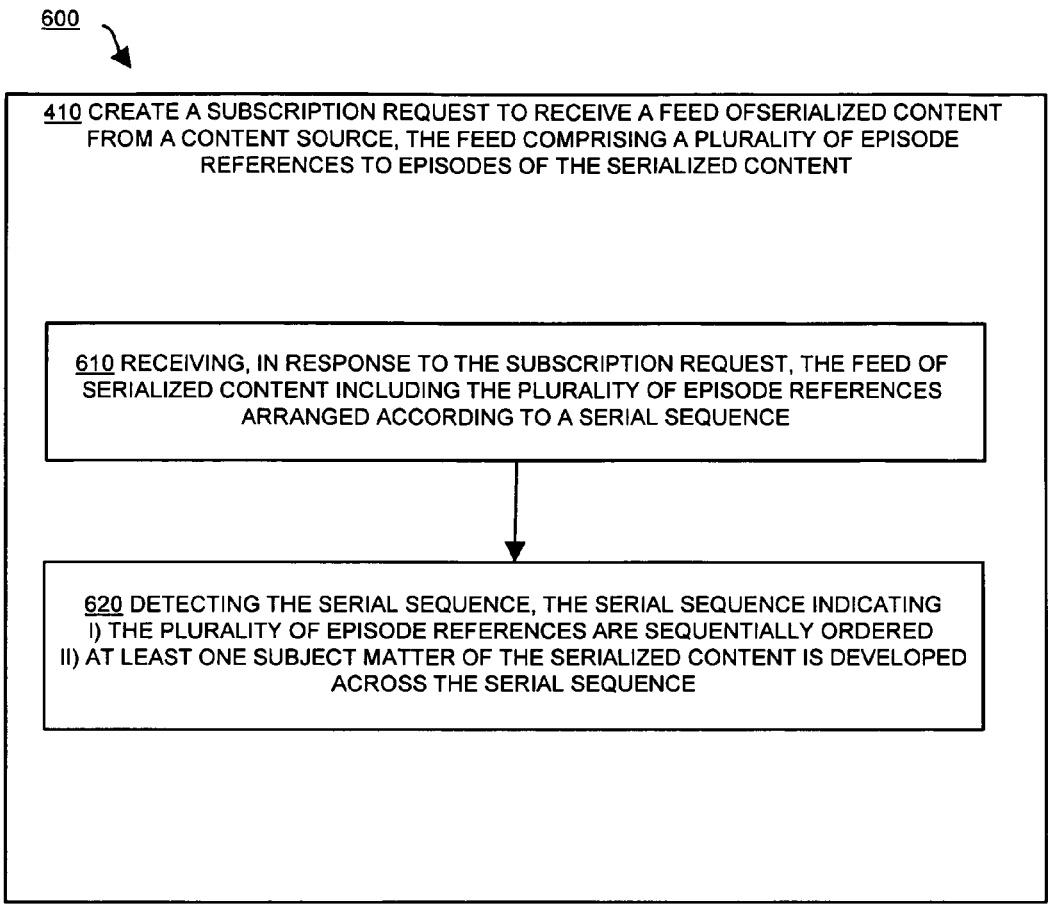
FIG. 6 is a flowchart of processing steps performed by the serial subscriber to create a subscription request to receive a feed of serialized content from the content source according to embodiments herein.

FIG. 6 is a flowchart of processing steps performed by the serial subscriber 150 to create a subscription request to receive a feed of serialized content from the content source according to embodiments herein. The steps in flowchart 600 relate to step 410 of FIG. 4 and to the features as illustrated in the block diagrams of FIG. 1 and FIG. 2. In step 610, the serial subscriber 150 receives, in response to the subscription request, the feed of serialized content including the plurality of episode references arranged according to a serial sequence. In step 620, the serial subscriber 150 detects the serial sequence, the serial sequence indicating the plurality of episode references are sequentially ordered the at least one subject matter of the serialized content is developed across the serial sequence.

It is understood that receiving episode references arranged according to the serial sequence includes receiving a plurality of references to serialized rich media episodes of the serialized content via Real Simple Syndication (R.S.S.) and rich media R.S.S. from a server system 210 associated with the content source 230. Each streaming data feed 199-3 in the set of streaming data feeds 199-1 to 199-X is arranged in a syndicated markup language format such as RSS or a variant or equivalent thereof that identifies content items 175 available for selection and viewing by a user of the application 150.

Figure 7:
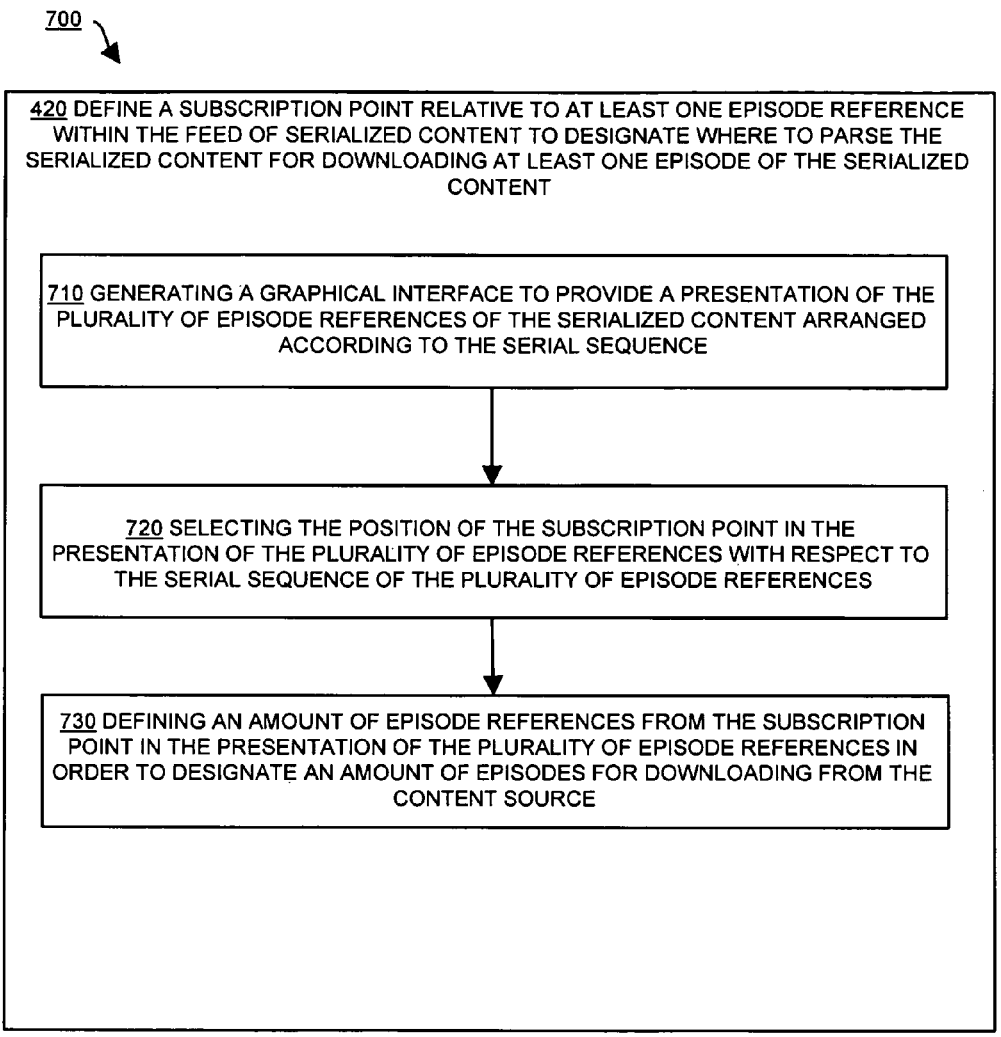
FIG. 7 is a flowchart of processing steps performed by the serial subscriber to define the subscription point relative to an episode reference within a feed to designate where to parse the serialized content for downloading the episode of the serialized content according to embodiments herein.

FIG. 7 is a flowchart of processing steps performed by the serial subscriber to define the subscription point relative to an episode reference within a feed to designate where to parse the serialized content for downloading the episode of the serialized content according to embodiments herein. The steps in flowchart 700 relate to step 420 of FIG. 4 and features as illustrated in the block diagrams of FIG. 1 and FIG. 2.

In step 710, the serial subscriber 150 generates a graphical interface to provide a presentation of the plurality of episode references of the serialized content arranged according to the serial sequence. For instance, a G.U.I., pop-up window, dialog box, frame, or other window can show the episode references arranged in order according to the serial sequence so the user has a visual cue as to the order of the episode references provided by the feed 199-3. The episode references can be ordered numerically, chronologically, or by storyline, for example.

In step 720, the serial subscriber 150 selects the position of the subscription point in the presentation of the plurality of episode references with respect to the serial sequence of the plurality of episode references. The user can select an episode reference in order to indicate where in the feed 199-3 to begin a subscription to the feed 199-3. In another embodiment, the user can highlight a position in the feed to designate where the subscription point in the feed 199-3 occurs. Alternatively, if that user has viewed that feed in the past, the serial subscriber can remember that last viewed position or episode reference and can visually indicate this location as a default subscription point to the user. The user may elect to change this location.

In step 730, the serial subscriber 150 defines an amount of episode references from the subscription point in the presentation of the plurality of episode references in order to designate an amount of episodes for downloading from the content source 230. As an example, the amount may be four additional episodes from the current subscription point.

Once the subscription point is defined and the user has designated an amount of episodes to download (or a default value is used), the feed 199-3 is downloaded and parsed at the subscription point. Once the download is complete, the subscription point is redefined by the download to take into account the episodes that have been downloaded. Thus, the serial subscriber 150 can take into account that episodes 175-1 through 175-M have been downloaded and can redefine the subscription point to just after episodes 175-1 through 175-M. Such subscription point can be stored at the serial subscriber 150 and applied to the feed 199-3 as the serial subscriber reconnects to the feed 199-3 in order to update the feed 199-3. Thus the client can remember the subscription point and can locally parse the feed and present it to the user using that point as a starting location (assuming episodes are available a that point in the feed), or the client can request the feed from the server beginning or including that episode and including a certain number of future episodes that have not yet been viewed by that user of that client.

In another embodiment, the serial subscriber 150 can be included with the server computer system 210 and receives a subscription request to create a subscription feed 199-3 of serialized content from a content source 230. In response to the subscription request, the serial subscriber 150 creates a U.R.L. for the subscription feed 199-3, and embeds one or more parameters into the U.R.L. that uniquely identifies the subscription request with the subscription feed 199-3. Thus, the subscription feed 199-3 is uniquely associated with the subscription request from the client and the subscription feed 199-3 is a subset of a main feed from the content source 230 that provides a plurality of episode references (175-1 through 175-M) to episodes of the serialized content provided by the content source 230. The serial subscriber 150 (in the server in this example) defines a subscription point to designate where, at the client, to parse the subscription feed 199-3 from the main feed for downloading at least one episode of the serialized content. The serial subscriber 150 back at the client thus creates a graphical representation of the at least one downloaded episode beginning at this subscription point. Alternatively, the server can produce a feed containing only the episodes beginning at the subscription point and including a preset or user determined number of later episodes.

At the content source 230 (e.g. server system 210), the serial subscriber monitors playback of the at least one downloaded episode to advance the subscription feed against the main feed according to the subscription point. This can occur, for example, by placing a cookie on the client computer that indicates that last set of episodes downloaded to that client.

Note again that techniques herein are well suited for a serial subscriber 150 configured to allow for providing an RSS feed that is updated according to the user's consumption of serialized content. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A computer-implemented method comprising:
   receiving, at a computer device, one or more episodes from a feed of serialized content, wherein the one or more episodes are received from a content server;
   tracking, via the computer device, a tracked position of consumption of the one or more episodes, wherein the tracked position of consumption is tracked based on consumption of the one or more episodes of the serialized content on the computer device;
   detecting, at the computer device, an update condition in relation to the consumption of the one or more episodes;
   sending, from the computer device to the content server, a request that the content server send one or more additional episodes from the feed of the serialized content, wherein the request identifies the tracked position of consumption of the one or more episodes at the computer device, wherein the content server selects the one or more additional episodes based on the tracked position of consumption identified in the request, wherein the request is sent in response to the update condition indicating that there remains only a predefined number of episode to be consumed; and
   receiving, at the computer device, the one or more additional episodes.

2. The method of claim 1 further comprising deleting, at the computer device, an episode of the one or more of the episodes based on the tracked position of consumption.

3. The method of claim 1 further comprising:
   receiving, at the computer device, a command to play the feed of serialized content;
   selecting, via the computer device, a selected episode of the one or more episodes or the one or more additional episodes to play based on the tracked position of consumption; and
   playing the selected episode on the computer device.

4. The method of claim 1 wherein the one or more additional episodes are limited to a user-specified number of episodes.

5. The method of claim 1 wherein the computer device requests a specific episode of the one or more episodes from the feed of serialized content.

6. A computer-implemented method comprising:
   sending, from a content server to a computer device, one or more episodes from a feed of serialized content;
   receiving, at the content server, an update condition detected at the computer device indicating that there remains only a predefined number of episode to be consumed;
   receiving, at the content server, a tracked position of consumption of the one or more episodes from the feed of serialized content, wherein the consumption occurs at the computer device;
   selecting, at the content server, one or more additional episodes from the feed of serialized content based on the tracked position of consumption, wherein the one or more additional episodes are less than all of the episodes in the feed of serialized content occurring after the one or more episodes; and
   sending, from the content server to the computer device, the one or more additional episodes, wherein the content server sends the one or more additional episodes in response to the update condition.

7. The method of claim 6 wherein a number of the one or more additional episodes selected from the serialized content is limited based on a user-specified limit.

8. A non-transitory computer-readable storage medium on which is encoded program code, the program code comprising:
   program code for receiving, at a computer device, one or more episodes from a feed of serialized content, wherein the one or more episodes are received from a content server;
   program code for tracking, via the computer device, a tracked position of consumption of the one or more episodes, wherein the tracked position of consumption is tracked based on consumption of the one or more episodes of the serialized content on the computer device;

program code for detecting, at the computer device, an update condition in relation to the consumption of the one or more episodes;

program code for sending, from the computer device to the content server, a request that the content server send one or more additional episodes from the feed of the serialized content, wherein the request identifies the tracked position of consumption of the one or more episodes at the computer device, wherein the content server selects the one or more additional episodes based on the tracked position of consumption identified in the request, and wherein the request is sent in response to the update condition indicating that there remains only a predefined number of episode to be consumed; and program code for receiving, at the computer device, the one or more additional episodes.

9. The computer-readable storage medium of claim 8 further comprising program code for deleting, at the computer device, an episode of the one or more of the episodes based on the tracked position of consumption.

10. The computer-readable storage medium of claim 8 further comprising:
program code for receiving, at the computer device, a command to play the feed of serialized content;
program code for selecting, via the computer device, a selected episode of the one or more episodes or the one or more additional episodes to play based on the tracked position of consumption; and
program code for playing the selected episode on the computer device.

11. The computer-readable storage medium of claim 8 wherein the one or more additional episodes are limited to a user-specified number of episodes.

12. The computer-readable storage medium of claim 8 wherein the requests is for a specific episode of the one or more episodes from the feed of serialized content.

* * * * *